(12) United States Patent
Shamban et al.

(10) Patent No.: US 12,204,638 B1
(45) Date of Patent: Jan. 21, 2025

(54) GENERATING SECURITY PERMISSIONS FOR CLOUD COMPUTING ASSETS IN CLOUD PLATFORMS

(71) Applicant: Persolvo Inc., Tel Aviv (IL)

(72) Inventors: Shira Shamban, Tel Aviv (IL); David Hendri, Tel Aviv (IL)

(73) Assignee: Persolvo Inc., Tel Aviv (IL)

( * ) Notice: Subject to any disclaimer, the term of this patent is extended or adjusted under 35 U.S.C. 154(b) by 261 days.

(21) Appl. No.: 17/940,966

(22) Filed: Sep. 8, 2022

Related U.S. Application Data (60) Provisional application No. 63/242,493, filed on Sep. 10, 2021.

(51) Int. Cl.
*G06F 21/00* (2013.01)
*G06F 21/53* (2013.01)

(52) U.S. Cl.
CPC ........ *G06F 21/53* (2013.01); *G06F 2221/034* (2013.01)

(58) Field of Classification Search
None
See application file for complete search history.

(56) References Cited

U.S. PATENT DOCUMENTS

| 11,748,189 B1* | 9/2023 | Mehta | H04L 63/20 714/15 |
| 2021/0124610 A1* | 4/2021 | Gardner | G06F 9/4881 |
| 2022/0294817 A1* | 9/2022 | Parekh | H04L 67/10 |

* cited by examiner

*Primary Examiner* — Andrew J Steinle
(74) *Attorney, Agent, or Firm* — Fenwick & West LLP (57) ABSTRACT

An online system determines security specification for cloud computing assets of a cloud computing platform. The system initializes a security specification and monitors execution of an application over a time interval to receive information describing application programming interface (API) invocations performed by the application. For each action performed by the API invocation, the system determines whether the security specification allows the actions performed by the API invocation with the cloud computing asset. The system modifies the security specification if necessary to allow the application to perform the particular action with the particular cloud computing asset. The system enforces security permissions for applications running on cloud computing platform based on the generated security specification.

20 Claims, 6 Drawing Sheets

GENERATING SECURITY PERMISSIONS FOR CLOUD COMPUTING ASSETS IN CLOUD PLATFORMS

CROSS-REFERENCE TO RELATED APPLICATIONS

This application claims the benefit of U.S. Provisional Application No. 63/242,493 filed Sep. 10, 2021, which is incorporated by reference herein.

BACKGROUND

Field of Art

This disclosure relates in general to security in cloud computing frameworks, and in particular to determining security permissions for cloud computing assets in a cloud platform.

Description of the Related Art

Organizations are increasingly relying on cloud platforms (or cloud computing platforms) such as AWS (AMAZON WEB SERVICES), GOOGLE cloud platform, MICROSOFT AZURE, and so on for their infrastructure needs. Cloud platforms provide servers, storage, databases, networking, software, and so on over the internet to organizations. Cloud computing assets of the cloud platform are not directly managed by the organization. Examples of cloud computing assets include computing systems such as an elastic compute cloud, cluster of machines, a server less compute service, and so on.

Organizations specify the security permissions for the cloud computing assets. The security permissions ensure that if some user gets unauthorized access to a cloud computing asset, the user has limited access to any other cloud computing assets. Broad security permissions allow such an unauthorized user to access a large number of cloud computing assets and perform unauthorized actions using these cloud computing assets. Organizations may execute various applications on the cloud computing platform. System administrators of organizations, however, may not have a good understanding of how these applications access the various cloud computing assets. Due to the lack of understanding of their access patterns, system administrators typically grant broad security permissions to assets to be able to execute these applications. Typically, these security permissions allow the assets to perform lot more actions using lot more cloud computing assets than the applications actually need. As a result, any security breach typically exposes significantly more data and resources rather than limiting the totality of exposed sources. In turn, this may cause potentially more damage than what could have been prevented. For example, a malicious actor that manages to get access to an asset may be able to access several other assets and perform various actions using the assets, for example, to corrupt the data.

BRIEF DESCRIPTION OF DRAWINGS

Figure (FIG. 1 is a block diagram of a system environment for determining security permissions for cloud computing platforms according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

An online system determines security specification for cloud computing assets of a cloud computing platform. The generated security specification for a particular cloud computing asset specifies security permissions identifying other cloud computing assets that the particular cloud computing asset is allowed to interact with and the types of actions that the particular cloud computing asset is allowed to perform with each of the other cloud computing assets. For example, the security permission for cloud computing asset A may specify that the asset A is allowed to read from asset B and asset A is allowed to write to asset C. A cloud computing asset may also be referred to herein as an asset, a cloud computing resource, a resource, a cloud computing service, or a service.

Organizations deploy various versions of software very frequently on cloud computing platforms. For example, an organization may deploy software multiple times a day. System administrators grant broad security permissions to assets to avoid having to modify the security permissions for each deployment. For example, the security permission may grant permission to perform all possible actions on a large set of assets. Following is an example of a broad security permission granted by a system administrator.

```
{
    Version: "2012-10-17"
    Statement: [
        {
            Action : [
                "sts:*"
                "ses:*"
                "s3:*"
                "logs:*"
            ],
            Resource: "*",
            Effect: "Allow"
        }
    ]
}
```

The above example security permissions allows actions for resources specified as "resource: "*" for example "sts:*", "ses:*", "s3:*" and so on, where sts, ses, and s3 are resource names and "*" refers to the allowed set of actions indicating all possible actions being allowed. The resource attribute specifies resource: "*" indicating that all resources are granted the above security permissions.

In contrast, the system according to various embodiments monitors execution of applications to determine the actual operations that the applications perform using the various assets. The system generates security permissions based on the monitored execution. The generated security permission allows only the actions that are performed by the applications during the monitored execution.

According to an embodiment, a system generates security specifications for cloud computing assets of a cloud platform. The system receives a request to generate security specification for cloud computing assets of a cloud platform. The system initializes a security specification and monitors execution of an application over a time interval by repeating the following steps. The system receives information describing an application programming interface (API) invocation performed by the application, the information comprising metadata describing one or more of: (1) a computing asset of the cloud platform, wherein the API invocation performs an action associated with the cloud computing asset, (2) the action performed by the API invocation on the cloud computing asset. For each action performed by the API invocation, the system determines whether the security specification allows the actions performed by the API invocation with the cloud computing asset. If the system identifies a particular action performed by the API invocation with a particular cloud computing asset that is not allowed by the security specification, the system modifies the security specification to allow the application to perform the particular action with the particular cloud computing asset. The system enforces security permissions for applications running on cloud computing platform based on the generated security specification.

Following is an example security permission generated by the system by monitoring execution of an application.

```
{
    Effect: "Allow"
    {
      Action : [
      "s3:DeleteObject:*"
      "s3:GetObject:*"
      ],
      Resource: "resource-address1",
    },
    Effect: "Allow"
    {
      Action : "s3:PutObject:*"
      Resource: "resource-address1",
    },
    {
      Condition : {
        ForAllValues: StringEquals: {
          Ses:FromAddress: [ "do-not-reply@xyz.com"]
        }
      },
      Effect: "Allow",
      Action: "ses:sendMail",
      Resource: "resource-address2",
    }
}
```

As shown above the security permissions generated by the system allow specific actions for specific assets. For example, the above security specification specifies specific actions such "s3:DeleteObject:*" and "s3:addObject:*" for specific resource. The security specification may specify specific conditions for allowing specific actions. The conditions specified may depend on the context in which the security permission is applicable. The user of specific permissions ensures that any asset does not have access to more resources than it needs for running the applications.

Overall System Environment

Figure 1:
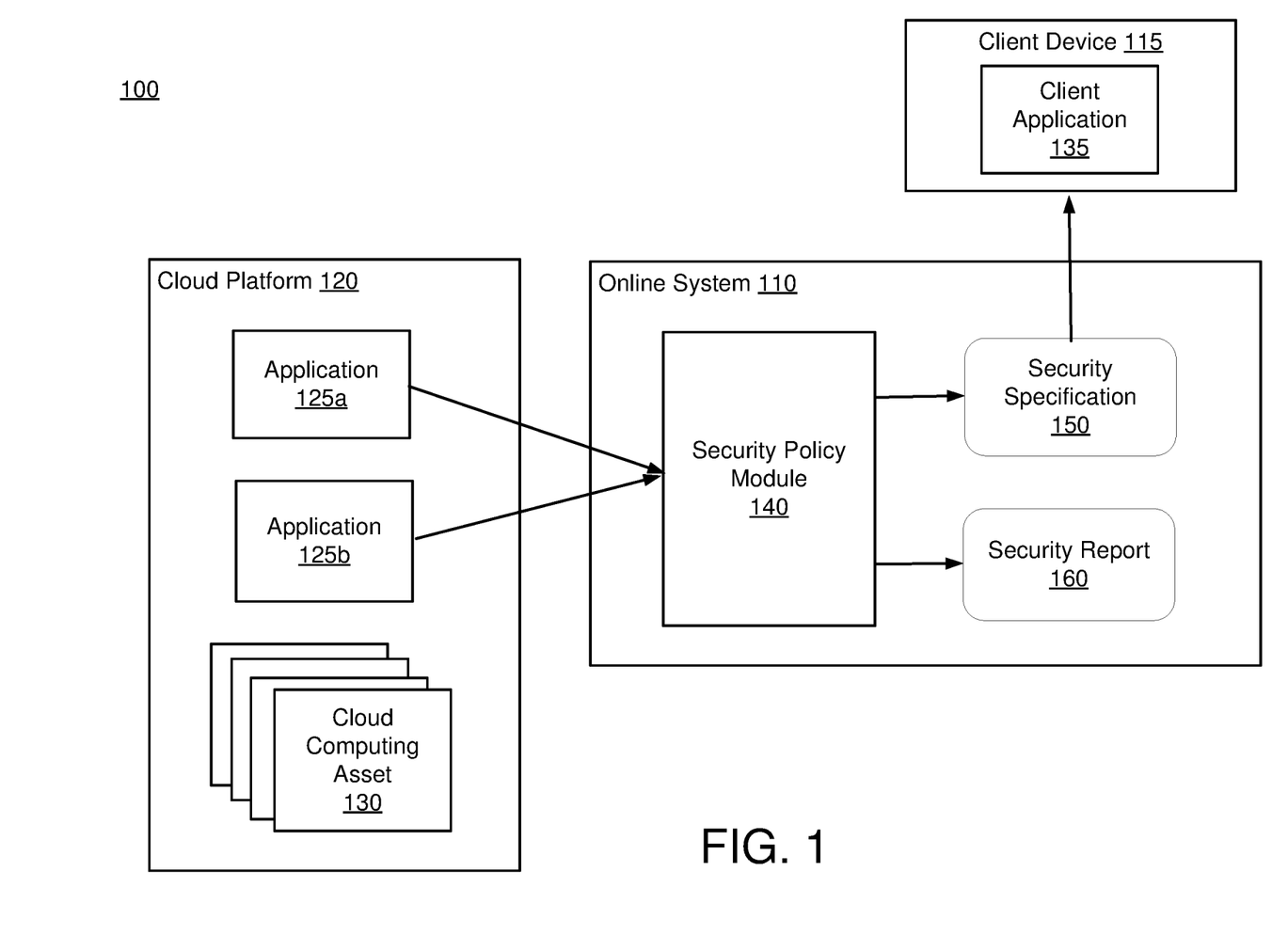

Figure (FIG.) 1 is a block diagram of a system environment for determining security permissions for cloud computing platforms according to one embodiment. The system environment 100 includes a cloud platform 120, a computing system 110, and a client device 115. Other embodiments may include more or fewer components and systems than those indicated in FIG. 1. Functions of various modules and systems described herein can be implemented by other modules and/or systems than those described herein.

The cloud platform 120 may be used by various online systems 110, each associated with an organization that uses the cloud platform 120. The cloud platform 120 includes cloud assets 130. Examples of cloud computing assets include computing systems such as an elastic compute cloud, cluster of machines, a server less compute service, and so on. The cloud platform 120 also executes applications 125a, 125b. The applications may be associated with different cloud computing assets 130. For example, an application may execute on a cloud computing asset and access other cloud computing assets. An application may perform different types of actions based on objects stored on another cloud computing asset, for example, reading an object, writing an object, deleting an object, and so on.

The online system 110 includes a security policy module 140 that monitors applications 125 running on the cloud platform. In an embodiment, the security policy module 140 receives metadata describing the application programming interfaces (APIs) invoked by an application 125. The security policy module 140 analyzes the metadata describing the APIs to determine the security permissions. The security policy module 140 generates security specification 150 based on the monitoring of the applications. The security specification 150 specifies the security permissions for cloud computing assets associated with the applications 125. The online system may send the generated security specification 150 to the cloud platform to enforce the security permissions for various cloud computing assets 130 according to the security specification 150.

In an embodiment, the online system 110 sends the security specification 150 for display via a client application 135 of a client device 115 for approval by a user, for example, by a system administrator. The system administrator may approve the generated security specification 150 or may make modifications to the security specification. The online system 110 receives a modified version of the security specification 150. The modified security specification 150 is sent to the cloud platform to enforce the security permissions for various cloud computing assets 130 according to the security specification 150.

In an embodiment, the security policy module 140 generates security reports 160 describing security permissions associated with different applications or different category of applications. A security report 160 is sent for display via a client application 135 running on a client device 115. The security report 160 may aggregate security information across various applications or various instances of an application executed by different clients of the cloud platform 120, for example, different organizations that use the cloud platform 120.

A client device 115 is used by users to interact with the online system 110. A user interacts with the online system 110 using client device 115 executing client application 135. An example of a client application 135 is a browser application. The client application provides a user interface that allows users to view security specifications 150 and security reports 160 generated by the online system 110. In an embodiment, the client application 135 interacts with the online system 110 using HTTP requests sent over a network.

FIG. 1 and the other figures use like reference numerals to identify like elements. A letter after a reference numeral, such as "125*a*," indicates that the text refers specifically to the element having that particular reference numeral. A reference numeral in the text without a following letter, such as "125," refers to any or all of the elements in the figures bearing that reference numeral (e.g. "125" in the text refers to reference numerals "125*a*" and/or "125*b*" in the figures).

The online system 110 and client devices 115 shown in FIG. 1 can be executed using computing devices. A computing device can be a conventional computer system executing, for example, a Microsoft™ Windows™-compatible operating system (OS), Apple™ OS X, and/or a Linux distribution. A computing device can also be a client device having computer functionality, such as a personal digital assistant (PDA), mobile telephone, video game system, etc. The online system 110 stores the software modules storing instructions for embodiments, for example security policy module 140.

The interactions between the client devices 115 and the online system 110 are typically performed via a network, for example, via the Internet. In one embodiment, the network uses standard communications technologies and/or protocols. In another embodiment, the entities can use custom and/or dedicated data communications technologies instead of, or in addition to, the ones described above. The techniques disclosed herein can be used with any type of communication technology, so long as the communication technology supports receiving by the online system 110 of web requests from a sender, for example, a client device 115 and transmitting of results obtained by processing the web request to the sender.

System Architecture

Figure 2:
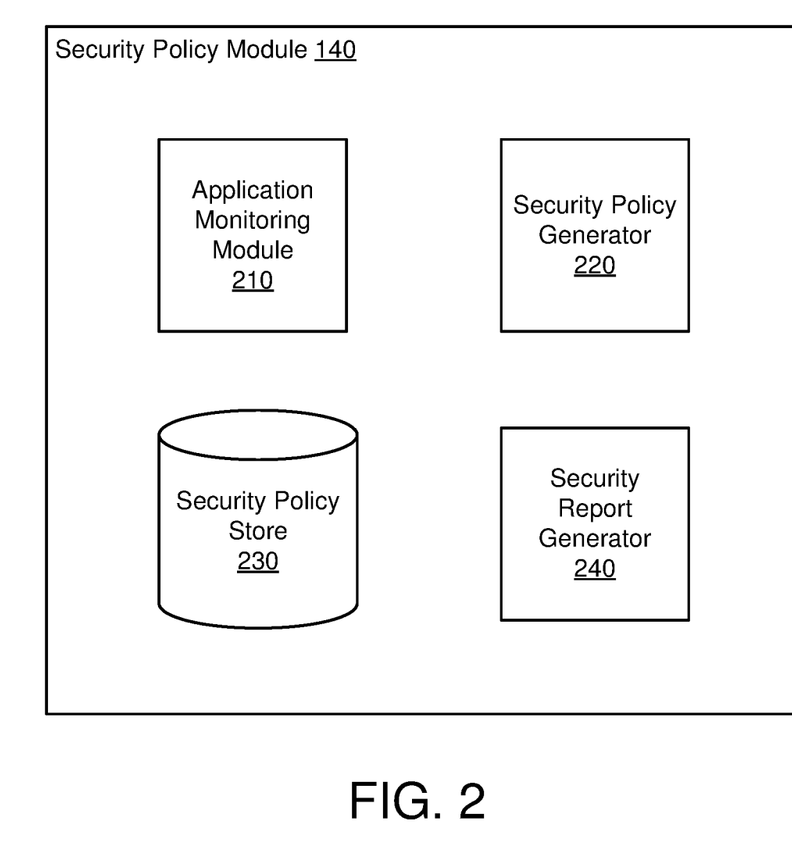
FIG. 2 is a block diagram illustrating system architecture ff a security policy module according to one embodiment.

FIG. 2 is a block diagram illustrating system architecture ff a security policy module according to one embodiment. The security policy module 140 comprises an application monitoring module 210, a security policy generator 220, a security policy store 230, and a security report generator 240. Other embodiments can have different and/or other components than the ones described here, and that the functionalities can be distributed among the components in a different manner.

The application monitoring module 210 monitors execution of applications running on the cloud platform. The application monitoring module 210 receives messages from applications comprising metadata describing APIs invoked by the application. In an embodiment, the application is executed for a time interval to execute a set of test scenarios that cause the application to execute APIs that the application is expected to execute subsequently. The application monitoring module 210 provides information describing the APIs executed by the applications to the security policy generator 220.

The security policy generator 220 receives information describing metadata of the APIs invoked by applications from the application monitoring module 210 and generates security specification comprising security policies for assets of the cloud platform. In an embodiment, the security policy generator 220 generates the security policies from scratch and does not start with a set of security polices that may be provided by another system or mechanism for generating security policies. Accordingly, the security policy generator 220 initializes a security policy for an asset to a security policy that does not allow the asset to perform any action on other assets. The security policy generator 220 identifies various actions performed by the application running on the asset. These actions access data or objects on other assets. The security policy generator 220 modifies the security policy for the asset to provide the minimum access to the other assets so that the application is able to execute the APIs as reported by the application monitoring module 210.

The security policy generator 220 stores the generated security policies in the security policy store 230. In an embodiment, the security policy store is a data store configured to store documents. The security policy generator 220 generates security policies that are represented as documents, for example, documents representing nested objects. The documents storing security polices may use JSON (Javascript Object Notation) representation, YAML representation, XML (extensible markup language) representation, or any other representation of nested objects.

The security report generator 240 generates reports describing security policies for applications. In an embodiment, the security report generator 240 generates reports including statistical information describing security policies for specific types of applications. The security report generator 240 may categorize applications based on their characteristics, for example, web applications, database applications, and so on. The security report generator 240 generates reports for each category of applications. The report may identify various types of assets and their security policies. The generated reports may be provided to system administrators interested in generating security polices for new applications. The system administrators can review the characteristics of the security policies for the category of applications that they are interested in.

In an embodiment, the security policy generator 220 creates a security identity that represents an account of the cloud platform. The security policy generator 220 grants security permissions according to the generated security policies to the security identity. The application is executed using the security identify and has the necessary security permissions.

Figure 3:
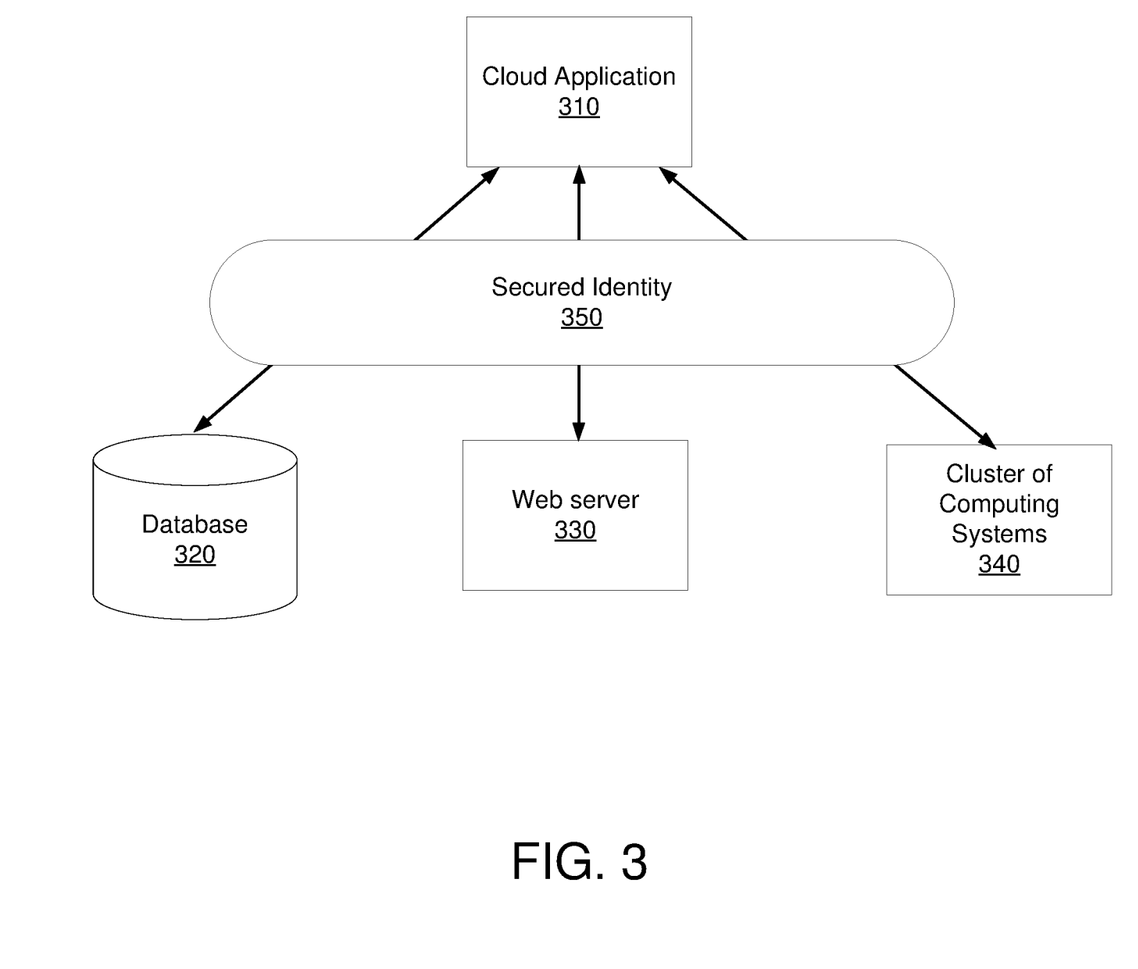
FIG. 3 illustrates implementation of security identify by the security policy module according to an embodiment.

FIG. 3 illustrates implementation of security identify by the security policy module according to an embodiment. The cloud application 310 executes using the security identity 350. The cloud application may access the various cloud computing assets including the database 320, the web server 330, or the cluster 340 of computing systems. The security identity determines the security permissions for the application. Accordingly, the application is only able to perform the actions permitted by the security permissions of the security identity for each cloud computing asset.

Overall Process

Figure 4:
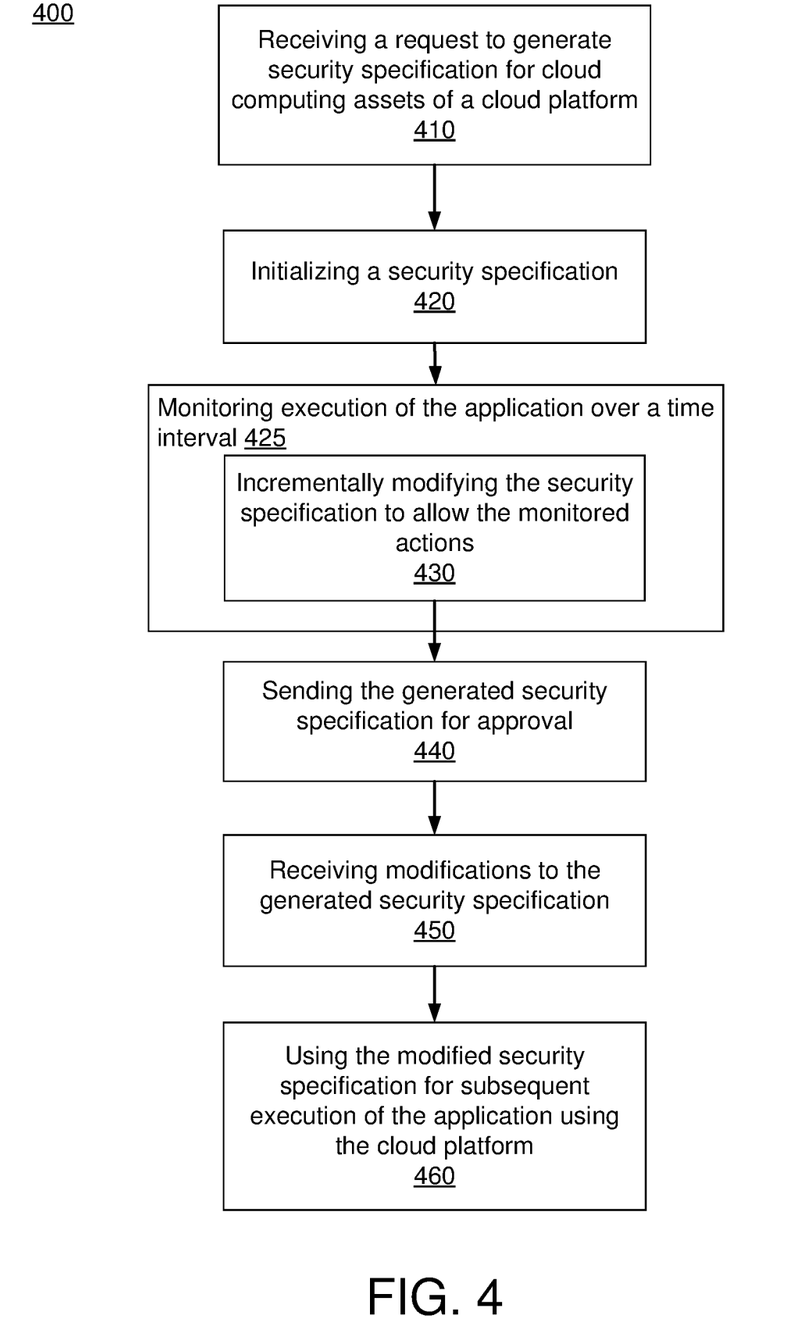
FIG. 4 is a flow chart illustrating the overall process for generating security policies according to one embodiment.

FIG. 4 is a flow chart illustrating the overall process for generating security policies according to one embodiment. Other embodiments can perform the steps of FIG. 4 in different orders. Moreover, other embodiments can include different and/or additional steps than the ones described herein. The various steps of the process may be performed by modules of the online system 110, for example, by the security policy module 140.

The online system 110 receives 410 a request to generate security specification for cloud computing assets of a cloud platform. The online system 110 initializes 420 the security specification. In an embodiment, the online system 110 initializes the security specification such that an asset is not allowed to perform any actions on any other assets. Accordingly, the initial security specification grants no access permissions to any assets.

The online system 110 monitors 425 execution of one or more applications and incrementally modifies 430 the security specification to allow the monitored actions of the applications. In an embodiment, the application code is instrumented to send metadata information describing APIs invoked by the application code to the online system 110 receives. The metadata information for an API invoked by the application describes the assets accessed by a given asset while executing the application. In an embodiment, the application code is instrumented to ensure that no data is provided to the online system while monitoring the execution of the application. As a result, parameters passed to an API or the values returned by the API are not provided to the online system 110. The application code is instrumented to send only metadata describing the assets accessed during the API invocation and the type of actions performed by the API using the asset, for example, create object operation, delete object operation, read object operation, and so on. Accordingly, the system honors data privacy by ensuring that data that may include sensitive information is not communicated to the online system. Also, the online system 110 does not receive any data from the application invocations, thereby ensuring that the online system does not receive and store any sensitive data, and therefore does not create a second system or location where a possible security breach can occur. Furthermore, monitoring only the metadata reduces the load on the application since the application has to transfer less data to the online system 110.

The online system 110 sends 440 the generated specification for approval to a system administrator, for example, via a client application 135 executing on a client device 115. The system administrator me modify the security specification. Accordingly, the online system receives 450 modifications to the generated security specification.

The online system 110 sends the modified security specification to the cloud platform for enforcement of the security permissions as specified by the security specification. The security permissions are enforced during subsequent execution of applications. The modified security specification is used 460 for subsequent execution of the application using the cloud platform.

The online system 110 determines the security specification based on the execution of one or more applications for specific inputs. Accordingly, the online system 110 may generate a different security specification if the security specification is generated by monitoring a different execution of the application, for example, execution based on a different set of input or different conditions that affect the execution. For example, if the application does not perform a particular type of operation using a particular asset during the phase when the online system monitors the execution of the application to generate the security specification, the generated security specification does not allow that particular type of action using that particular asset, even if the application attempts to perform that type of action using that asset during a subsequent execution.

Figure 5:
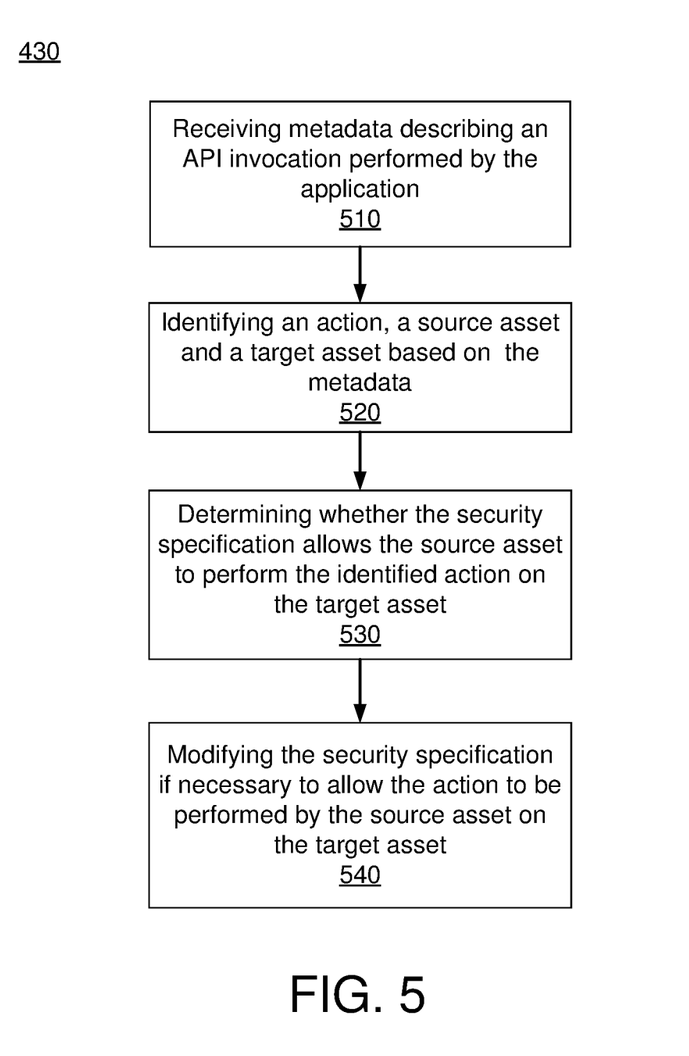
FIG. 5 is a flow chart illustrating the process for modifying security specification according to one embodiment.

FIG. 5 is a flow chart illustrating the process for modifying security specification according to one embodiment. The process illustrated in FIG. 5 shows the details of the step 430 of the process 400 shown in FIG. 4. Other embodiments can perform the steps of FIG. 4 in different orders. Moreover, other embodiments can include different and/or additional steps than the ones described herein.

The online system 110 receives 510 metadata describing an API invocation performed by the application 510. The online system 110 identifies 520 based on the metadata, the action performed by the API invocation as well as a source cloud computing asset that performs the action and a target cloud computing asset on which the action is performed. For example, the online system 110 may identify 520 that the application running on a server asset performed a read object operation on a database asset.

The online system 110 determines 530 whether the security specification allows the identified action to be performed by the source cloud computing asset on the target cloud computing asset. For example, a previous invocation of the same API may have caused the security specification to be modified to allow the identified action. If the security specification allows the identified action for the identified cloud computing asset, the online system 110 skips the API invocation and waits for the next API invocation. If the online system 110 determines 530 that the security specification does not allow the identified action to be performed by the source cloud computing asset on the target cloud computing asset, the online system 110 modifies 540 the security specification to allow the action to be performed by the source cloud computing asset on the target cloud computing asset.

In an embodiment, the online system 110 monitors the execution of applications in a test environment. The application may execute a set of test cases that exercise various portions of code of the application. The online system generated the security specification based on the execution in the test environment and uses the generated security specification for a development environment.

In an embodiment, the application executes using a runtime environment and the runtime environment is configured to intercept an API invocation and send metadata describing the API invocation to the online system. The online system 110 monitors APIs executed by an application by monitoring a runtime engine used by the application, for example, a virtual machine or a software development kit (SDK) used by the application for execution. The virtual machine checks when the application executes an API and extracts the metadata describing the API. The virtual machine forwards the extracted metadata to the online system 110. Accordingly, the virtual machine performs transparent instrumentation to monitor the applications without requiring the applications to be modified. In an embodiment, a library associated with the online system is installed in the system executing the application. The library interacts with the runtime environment, for example, a virtual machine used by the application to monitor the API invocations for sending their metadata to the online system. In an embodiment, the online system is associated with multiple libraries, each library combined with a runtime environment used by some applications, for example, JAVA runtime, PYTHON runtime, and so on.

According to an embodiment, the online system can monitor a user account and track all activities of the user account over a period of time to generate security policy for that user account. The online system monitors all the applications that are executed by the user account over a time interval to determine the various cloud computing assets that the user account accesses and the types of actions that the user account performs using the cloud computing assets. The online system generates a security specification that grants the security permissions that are necessary for the user account to perform the monitored actions. This ensures that a user account is not granted access to more assets than needed. This ensures that if a malicious user manages to get access to the user account, the exposure of the malicious user is minimum. Similarly, the online system may also monitor networks and generate security specification for networks based on the assets accessed by the network during a particular time interval based on a particular set of execution of applications using the network.

In an embodiment, the online system 110 generates security policies for a set of cloud computing assets specified using infrastructure as code IaC). The online system 110 monitors applications associated with the set of cloud computing assets configured using infrastructure as code. The online system 110 receives metadata describing APIs executed by applications associated with the set of cloud computing assets and generates security specification based on the monitored actions as described in FIGS. 4 and 5.

According to an embodiment, the application represents a particular software release of the application, for example software release R1. For example, the application may comprise instructions stored in a software artifact. Each software release of the application may correspond to a different version of the software artifact comprising a set of instruction. The online system receives a second software release of the application. The security specification of the software release R1 of the application is referred to as S1. The second software release is obtained responsive to modifications to source code of the application. The online system receives a request to generate security specification for the second software release R2 of the application. The online system initializes a second security specification S2 for the application. The online system monitors execution of the second software release of the application over a second time interval. The online system modifies the security specification S2 based on the monitoring of the execution of the release R2 of the application over the second time interval. If the instructions of the software release R2 are significantly different, resulting in different actions being performed by the application, the modified second security specification S2 is likely to be different from the first security specification S1. For example, if certain new actions are performed during execution of the software release R2 that were not performed during execution of software release R1, the second security specification S2 includes portions based on APIs invoked during the second software release R2 that were not invoked by the first software release R1.

Computer Architecture

Figure 6:
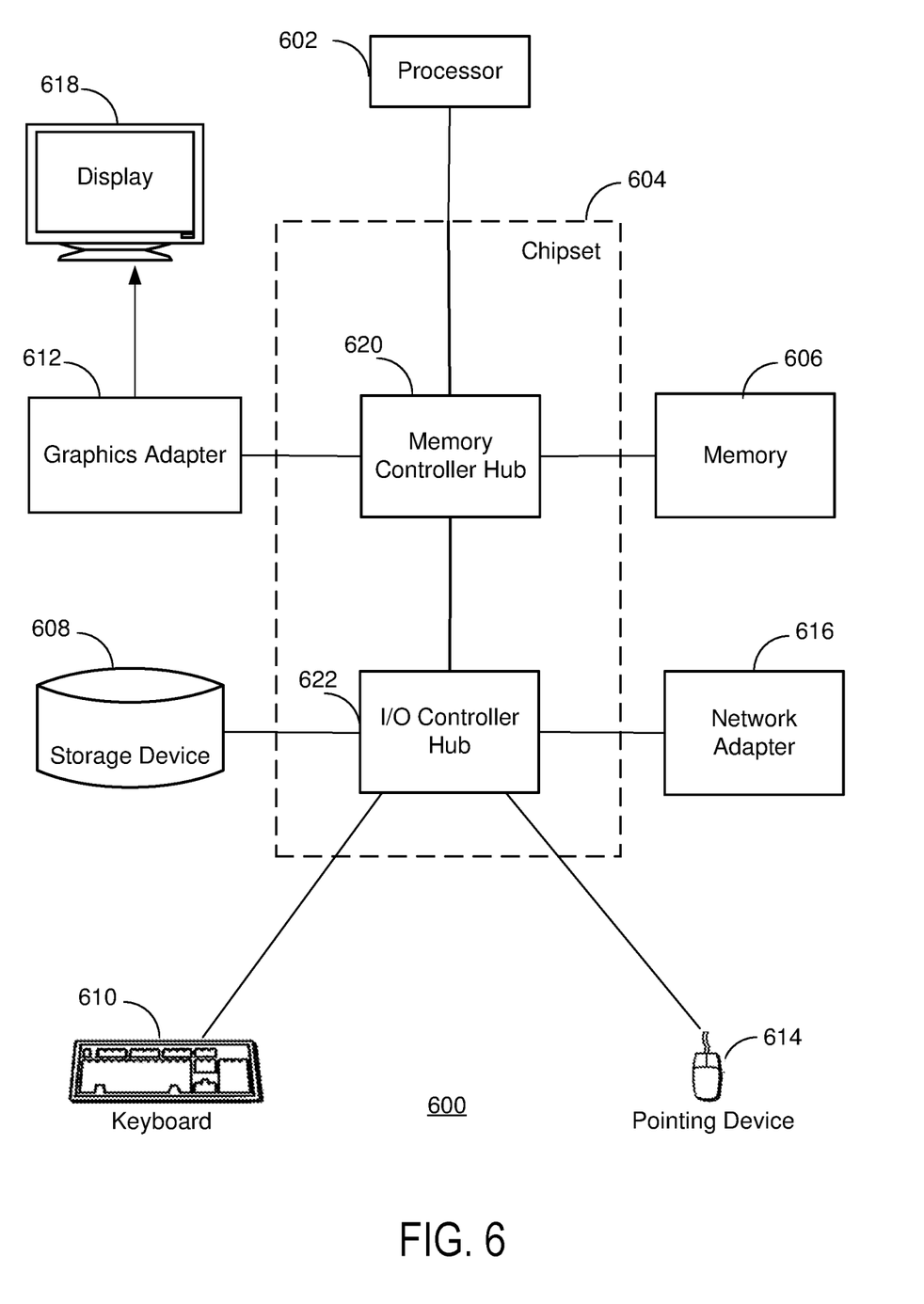
FIG. 6 is a block diagram illustrating a functional view of a typical computer system for use in the environment of FIG. 1 according to one embodiment.

FIG. 6 is a high-level block diagram illustrating a functional view of a typical computer system for use as one of the entities in the environment 100 of FIG. 1 according to an embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is a non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system. The graphics adapter 612 displays images and other information on the display 618. The network adapter 616 couples the computer system 600 to the network.

As is known in the art, a computer 600 can have different and/or other components than those shown in FIG. 6. In addition, the computer 600 can lack certain illustrated components. For example, a computer system acting as an online system may lack a keyboard 610 and a pointing device 614. Moreover, the storage device 608 can be local and/or remote from the computer 600 (such as embodied within a storage area network (SAN)).

The computer 600 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 608, loaded into the memory 606, and executed by the processor 602.

The types of computer systems 600 used by the entities of FIG. 1 can vary depending upon the embodiment and the processing power used by the entity. For example, a client device may be a mobile phone with limited processing power, a small display 618, and may lack a pointing device 614. The online system, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A computer-implemented method for generating security specifications for cloud computing assets of a cloud platform, the method comprising:
    receiving, by an online system, a request to generate security specification for cloud computing assets of a cloud platform;
    initializing a security specification;
    monitoring execution of an application over a time interval, the monitoring comprising, repeating over the time interval:
        receiving information describing an application programming interface (API) invocation performed by the application, the information comprising metadata describing: (1) a cloud computing asset of the cloud platform on which the API invocation is performed, and (2) an action performed by the API invocation on the cloud computing asset;
        for each action performed by the API invocation, wherein the action is performed with a cloud computing asset, determining whether the security specification allows the actions performed by the API invocation with the cloud computing asset; and
        responsive to identifying a particular action performed by the API invocation with a particular cloud computing asset that is not allowed by the security specification, modifying the security specification to allow the application to perform the particular action with the particular cloud computing asset; and
    enforcing security permissions for applications running on cloud computing platform based on the generated security specification.

2. The computer-implemented method of claim 1, wherein the application executes using a runtime environment, wherein the runtime environment is configured to intercept an API invocation and send metadata describing the API invocation to the online system.

3. The computer-implemented method of claim 1, further comprising:
    sending the generated security specification for display via a user interface for approval; and
    responsive to receiving an approval, enforcing security permissions for applications running on cloud computing platform using the modified security specification.

4. The computer-implemented method of claim 1, wherein an action performs one of:
    reading an object, adding an object, modifying an object, or deleting an object.

5. The computer-implemented method of claim 1, wherein an asset is one of: a database, a cluster of computing systems, or a storage system.

6. The computer-implemented method of claim 1, wherein the application is instrumented to send metadata describing API invocations to the online system.

7. The computer-implemented method of claim 1, wherein the application is configured to perform at least a first action using a first asset, and wherein responsive to the API invocations failing to perform the first action using the first asset, the security specification prevents the application from performing the first action using the first asset.

8. The computer-implemented method of claim 1, wherein the application is a first application, the method further comprising:
    monitoring by the system, a plurality of other applications;
    determining a category of application representing a subset of the plurality of applications based on one or more attributes of the applications; and
    generating a report describing security specifications of the category of applications.

9. The computer-implemented method of claim 1, wherein the application represents a first release of the application, the method further comprising:
    receiving, by the online system, a second release of the application, wherein the second release is obtained responsive to modifications to source code of the application;
    receiving a request to generate security specification for the second release of the application;
    initializing a second security specification for the application;
    monitoring an execution of the second release of the application over a second time interval; and
    modifying the second security specification based on the monitoring of the execution of the second release of the application over the second time interval, wherein the modified second security specification is different from the first security specification.

10. A non-transitory computer readable storage medium storing instructions that when executed by a computer processor, cause the computer processor to:
- receive, by an online system, a request to generate security specification for cloud computing assets of a cloud platform;
- initialize a security specification;
- monitor execution of an application over a time interval, the monitoring causing the computer processor to repeat over the time interval:
  - receive information describing an application programming interface (API) invocation performed by the application, the information comprising metadata describing: (1) a cloud computing asset of the cloud platform on which the API invocation is performed, and (2) an action performed by the API invocation on the cloud computing asset;
  - for each action performed by the API invocation, wherein the action is performed with a cloud computing asset, determine whether the security specification allows the actions performed by the API invocation with the cloud computing asset; and
  - responsive to identifying a particular action performed by the API invocation with a particular cloud computing asset that is not allowed by the security specification, modify the security specification to allow the application to perform the particular action with the particular cloud computing asset; and
- enforce security permissions for applications running on cloud computing platform based on the generated security specification.

11. The non-transitory computer readable storage medium of claim 10, wherein the application executes using a runtime environment, wherein the runtime environment is configured to intercept an API invocation and send metadata describing the API invocation to the online system.

12. The non-transitory computer readable storage medium of claim 10, wherein the instructions further cause the computer processor to:
- send the generated security specification for display via a user interface for approval; and
- responsive to receiving an approval, enforce security permissions for applications running on cloud computing platform using the modified security specification.

13. The non-transitory computer readable storage medium of claim 10, wherein an action performs one of: reading an object, adding an object, modifying an object, or deleting an object.

14. The non-transitory computer readable storage medium of claim 10, wherein an asset is one of: a database, a cluster of computing systems, or a storage system.

15. The non-transitory computer readable storage medium of claim 10, wherein the application is instrumented to send metadata describing API invocations to the online system.

16. The non-transitory computer readable storage medium of claim 10, wherein the application is configured to perform at least a first action using a first asset, and wherein responsive to the API invocations failing to perform the first action using the first asset, the security specification prevents the application from performing the first action using the first asset.

17. The non-transitory computer readable storage medium of claim 10, wherein the application is a first application, wherein the instructions further cause the computer processor to:
- monitor a plurality of other applications;
- determine a category of application representing a subset of the plurality of applications based on one or more attributes of the applications; and
- generate a report describing security specifications of the category of applications.

18. The non-transitory computer readable storage medium of claim 10, wherein the application represents a first release of the application, wherein the instructions further cause the computer processor to:
- receive a second release of the application, wherein the second release is obtained responsive to modifications to source code of the application;
- receive a request to generate security specification for the second release of the application;
- initialize a second security specification for the application;
- monitor an execution of the second release of the application over a second time interval; and
- modify the second security specification based on the monitoring of the execution of the second release of the application over the second time interval, wherein the modified second security specification is different from the first security specification.

19. A computer system comprising:
- a computer processor; and
- a non-transitory computer readable storage medium storing instructions that when executed by the computer processor cause the computer processor to perform steps for comparing network security specifications for equivalent networks, the steps comprising:
  - receive a request to generate security specification for cloud computing assets of a cloud platform;
  - initialize a security specification;
  - monitor execution of an application over a time interval, the monitoring causing the computer processor to repeat over the time interval:
    - receive information describing an application programming interface (API) invocation performed by the application, the information comprising metadata describing: (1) a cloud computing asset of the cloud platform on which the API invocation is performed, and (2) an action performed by the API invocation on the cloud computing asset;
    - for each action performed by the API invocation, wherein the action is performed with a cloud computing asset, determine whether the security specification allows the actions performed by the API invocation with the cloud computing asset; and
    - responsive to identifying a particular action performed by the API invocation with a particular cloud computing asset that is not allowed by the security specification, modify the security specification to allow the application to perform the particular action with the particular cloud computing asset; and
  - enforce security permissions for applications running on cloud computing platform based on the generated security specification.

20. The computer system of claim 19, wherein the application represents a first release of the application, wherein the instructions further cause the computer processor to:
- receive a second release of the application, wherein the second release is obtained responsive to modifications to source code of the application;

receive a request to generate security specification for the second release of the application;
initialize a second security specification for the application;
monitor an execution of the second release of the application over a second time interval; and
modify the second security specification based on the monitoring of the execution of the second release of the application over the second time interval, wherein the modified second security specification is different from the first security specification.

* * * * *